(12) United States Patent
Kadow (10) Patent No.: US 10,385,989 B2
(45) Date of Patent: Aug. 20, 2019

(54) SECURING DEVICE FOR A VALVE

(71) Applicant: MSA Europe GmbH, Jona (CH)

(72) Inventor: Peter Kadow, Berlin (DE)

(73) Assignee: MSA Europe GmbH, Jona (CH)

(*) Notice: Subject to any disclaimer, the term of this patent is extended or adjusted under 35 U.S.C. 154(b) by 10 days.

(21) Appl. No.: 15/026,419

(22) PCT Filed: Oct. 1, 2014

(86) PCT No.: PCT/EP2014/071064
§ 371 (c)(1),
(2) Date: Mar. 31, 2016

(87) PCT Pub. No.: WO2015/049299
PCT Pub. Date: Apr. 9, 2015

(65) Prior Publication Data
US 2016/0238155 A1  Aug. 18, 2016

(30) Foreign Application Priority Data

Oct. 1, 2013 (DE) .................. 10 2013 219 956

(51) Int. Cl.
*F16K 35/00* (2006.01)
*F16K 35/02* (2006.01)
*F17C 13/04* (2006.01)

(52) U.S. Cl.
CPC ............ *F16K 35/02* (2013.01); *F16K 35/025* (2013.01); *F17C 13/04* (2013.01); *F17C 2205/0329* (2013.01); *F17C 2270/079* (2013.01)

(58) Field of Classification Search
CPC ........ F16K 35/02; F16K 35/025; F17C 13/04; F17C 2270/079; F17C 2205/0329
USPC ............ 251/233, 252, 101, 102, 103, 84, 87
See application file for complete search history.

(56) References Cited

U.S. PATENT DOCUMENTS

| 127,883 | A | * | 6/1872 | Hotz | F16K 35/025 251/107 |
|---|---|---|---|---|---|
| 1,079,254 | A | | 11/1913 | McCarthy | |
| 1,601,620 | A | * | 9/1926 | Haller | F16K 35/02 251/93 |
| 1,764,991 | A | * | 6/1930 | Siebs | F16K 35/02 251/322 |
| 1,990,635 | A | * | 2/1935 | Buttner | F16K 7/16 251/233 |
| 2,340,143 | A | * | 1/1944 | Rider | F17C 13/04 137/553 |

(Continued)

FOREIGN PATENT DOCUMENTS

| CN | 2230385 Y | 7/1996 |
|---|---|---|
| GB | 243847 A | 12/1925 |
| JP | H 08303637 A | 11/1996 |

*Primary Examiner* — Umashankar Venkatesan
(74) *Attorney, Agent, or Firm* — The Webb Law Firm (57) ABSTRACT

A securing device for a valve of a pressurized gas tank of a respiratory protection device, characterized by a securing element, which can be moved from a closed position to a flow position, especially an open position, by applying a torque, wherein at least one part of a housing serves as an abutment for the securing element when the torque is applied, wherein the valve is closed in the closed position of the securing element and can be brought spontaneously into a flow position after applying a particular torque to the securing element.

19 Claims, 8 Drawing Sheets

(56) References Cited

U.S. PATENT DOCUMENTS

| | | | | | |
|---|---|---|---|---|---|
| 2,441,094 | A | * | 5/1948 | Alderfer | F16K 35/02 222/153.08 |
| 2,680,546 | A | * | 6/1954 | Seaberg | F16L 29/007 137/321 |
| 4,298,182 | A | * | 11/1981 | Balch | F16K 35/02 137/351 |
| 6,367,775 | B1 | * | 4/2002 | Nimberger | F16K 31/46 251/109 |
| 6,390,158 | B2 | * | 5/2002 | Johnston | F16K 1/303 141/383 |
| 8,851,446 | B2 | * | 10/2014 | Nimberger | F16K 35/02 251/107 |
| 2003/0001124 | A1 | * | 1/2003 | Chen | F16K 35/025 251/113 |
| 2009/0261280 | A1 | | 10/2009 | Matsushita et al. | |
| 2012/0175375 | A1 | * | 7/2012 | Ligonesche | F16K 31/602 220/581 |

\* cited by examiner

SECURING DEVICE FOR A VALVE

CROSS-REFERENCE TO RELATED APPLICATIONS

This application is the United States national phase of International Application No. PCT/EP2014/071064 filed Oct. 1, 2014, and claims priority to German Patent Application No. 10 2013 219 956.2 filed Oct. 1, 2013, the disclosures of which are hereby incorporated in their entirety by reference.

BACKGROUND OF THE INVENTION

Field of the Invention

The subject matter described herein generally concerns a securing device for a valve.

Description of Related Art

Especially in the field of respiratory protection devices it is often necessary for pressurized gas tanks to be stored over a lengthy time, in which case it must be guaranteed that the pressure in the pressurized gas tanks is also maintained over a lengthy time. Thus, EN 402 stipulates that the pressure in a pressurized gas tank must be maintained at 4500 psi (31.03 MPa) over five years. This requires high closing forces for the valves of the pressurized gas tank.

Now, if such a pressurized gas tank is to be placed quickly in service—especially in an emergency—the valve must be quickly brought to a flow position in which the gas can flow from the pressurized gas tank.

SUMMARY OF THE INVENTION

In summary, one embodiment provides a securing device for a valve of a pressurized gas tank, especially for a respiratory protection device, characterized by a securing element (1), which can be moved from a closed position to a flow position, especially an open position, by applying a torque (M), wherein at least one part of a housing (10) serves as an abutment (11) for the securing element (1) when the torque (M) is applied, wherein the valve (20) is closed in the closed position of the securing element (1) and can be brought spontaneously into a flow position after applying a particular torque (M) to the securing element (1).

Another embodiment provides a securing device for a valve of a pressurized fluid tank, comprising: a valve connected to the pressurized fluid tank; a movable valve element disposed within the valve and reversibly obstructing flow of fluid from the pressurized fluid tank via the valve; and a securing element that, in a first position, abuts the movable valve element in a fashion to hold the movable valve element in a closed position; the securing element being movable to a second position by lever action about a fulcrum provided by at least one element of the valve; wherein, in the second position, the securing element allows the movable valve element to transition to an open position to provide flow of the fluid from the pressurized fluid tank.

A further embodiment provides a pressurized fluid tank, comprising: a tank holding pressurized fluid; a valve connected to the tank; a movable valve element disposed within the valve and reversibly obstructing flow of fluid from the tank via the valve; and a securing element that, in a first position, abuts the movable valve element in a fashion to hold the movable valve element in a closed position; the securing element being movable to a second position by lever action about a fulcrum provided by at least one element of the valve; wherein, in the second position, the securing element allows the movable valve element to transition to an open position to provide flow of the fluid from the tank.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

Sample embodiments will be discussed in connection with the figures. There are shown.

DETAILED DESCRIPTION OF THE INVENTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of certain example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of certain embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described herein, a goal is to create a securing device that allows a secure closure of the pressurized gas tank in the storage position, but at the same time a quick activation of the pressurized gas tank in the position of use. This goal is achieved by a securing device with the features of the example embodiments and claims described herein.

For example, a securing element can be moved from a closed position to a flow position, especially an open position, by applying a torque, wherein at least one part of a housing serves as an abutment for the securing element when the torque is applied, wherein the valve is closed in the closed position of the securing element and can be brought spontaneously into a flow position after applying a particular torque to the securing element. Thus, the securing element works together with the surrounding housing to apply a torque with which the securing element is rotated out from the housing.

In an embodiment, a securing element works together with the surrounding housing to apply a torque with which the securing element is rotated out from the housing. By way of specific example, in one embodiment a securing element can be moved from a closed position to a flow position, especially an open position, by applying a torque, wherein at least one part of a housing serves as an abutment for the securing element when the torque is applied, wherein the valve is closed in the closed position of the securing element and can be brought spontaneously into a flow position after applying a particular torque to the securing element.

In particular, for better guidance in the turning, the abutment can be arranged at least partly on a sliding block guide in the housing.

In order to apply the torque effectively, the securing element can have a handling element as a point of attack or application of a force producing the torque. In this case, the handling element can have a fastening element, such as a lug, for a traction element to apply the torque.

Depending on the molding of the housing, a point-like or a surface contact can be present on the abutment between a securing element and housing. In this case, entirely different kinds of contact can be present in different phases of the rotation of the securing element.

The securing element can essentially have a variety of shapes, e.g., the shape of a key, a rod, or a flat cube. For a key shape, there is a broader part as the handling element, and the narrower part lies inside the housing and closes the valve when the securing element is in the closed position.

The securing element can have a means, mechanism, or arrangement that converts a valve force into a torque, which is sustained. The valve force is relatively high, due to the pressure conditions in the pressurized gas tank. If a portion of this force is used to sustain the torque for the turning process, the turning becomes easier. Such a means, mechanism, or arrangement for converting the valve force can be, for example, provided by application of force on the securing element, especially a beveled edge, and the valve force is diverted by the application so that it sustains the torque.

It is also possible to provide a detent or other means on the securing element, wherein the detent together with the valve ensures a removable locking in the closed position. In this way, a premature inadvertent loosening of the securing element can be avoided. The valve tappet can engage with a trough, e.g., during the closed position, so that a mechanical resistance has to be overcome during the initial movement of the securing element before a spontaneous adopting of the flow position can occur.

Moreover, the valve may be configured as an automatically activated valve, thereby providing additional advantage.

Various examples are now described with reference to the figures in which certain non-limiting examples are illustrated.

In what follows, the mode of functioning of a securing element 1 shall be explained by means of an example embodiment with a valve for a pressurized gas tank for a respiratory protection device. The securing element 1 can basically also be used in other designs of pressurized gas tanks. Pressurized gas tanks are also used in the inflating of life rafts, life jackets, or fire extinguishers and such a securing element 1 can be used in these and like applications.

Figure 1:
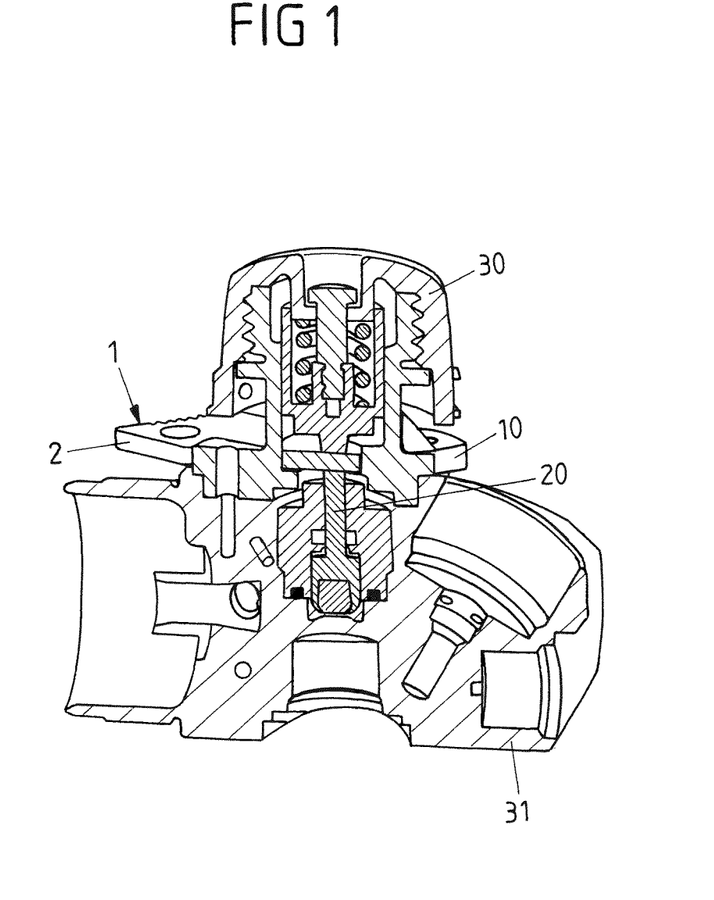
FIG. 1 illustrates a sectional view of an example valve in an example valve housing.

FIG. 1 shows a pressure reducer with valve housing 31 and a hand wheel 30. The securing element 1 for the valve 20 is arranged here in its own housing 10. In the sectional view of FIG. 1 it is illustrated that the valve 20, i.e., the valve tappet arranged vertically in this view, is held closed by the horizontally arranged securing element 1. Typically, this position is adopted during the storage of a pressurized gas tank, not shown here. After the securing element 1 is turned out—as is yet to be described—the hand wheel 30 can be used to adjust the flow volume. For this reason, the securing element 1 is also known as a "starter key".

Figure 1A:
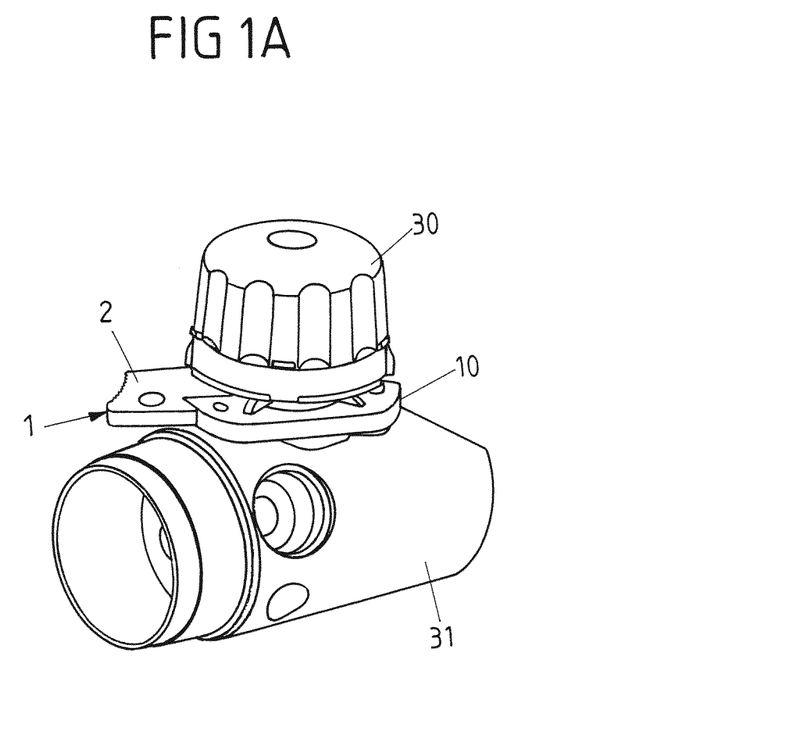
FIG. 1A illustrates a perspective view of the valve housing of FIG. 1.

In FIG. 1A, the valve housing 31 with the hand wheel 30 is shown in a perspective view. A handling element 2 of the securing element 1 is easily accessible from the outside.

Figure 2:
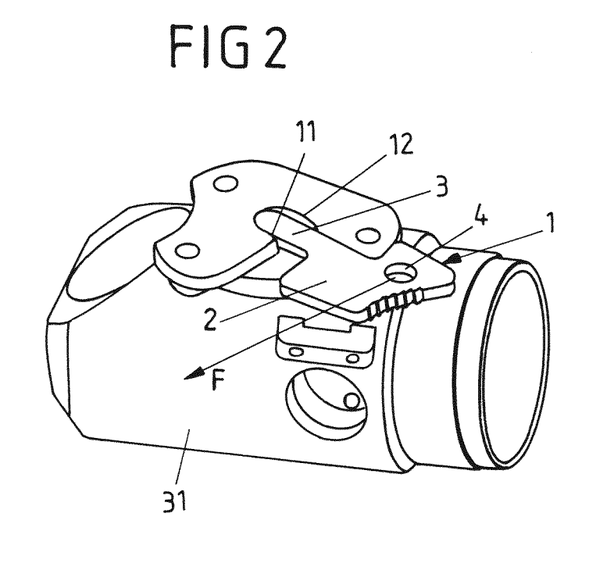
FIG. 2 illustrates a perspective view of an example securing element in an example housing.

In order to better show the functioning of the securing element 1, FIG. 2 basically shows the situation of FIG. 1A without showing the hand wheel 31. The securing element 1 here is configured as a flat element in the shape of a key. A broader handling element 2 serves as a point of attack or application of a force F to apply a torque M (as illustrated in FIG. 3-FIG. 6) in order to turn the securing element 1 out from the housing 10. The handling element 2 passes into a narrower closing element 3, which in the closed position shown here prevents the valve 20 from opening.

On the handling element 2 there is arranged a lug as a fastening element 4 for a cord, not shown here, as a traction element. By pulling on the cord, a predetermined torque M can be applied, by which the closing element 1 is turned out from the housing 10 in order to release the valve 20, i.e., to bring it into a flow position. The flow position can—but need not—coincide with the open position of the valve 1. A flow is accomplished already in a partial opening of the valve, which may be sufficient to perform its function.

Figure 3:
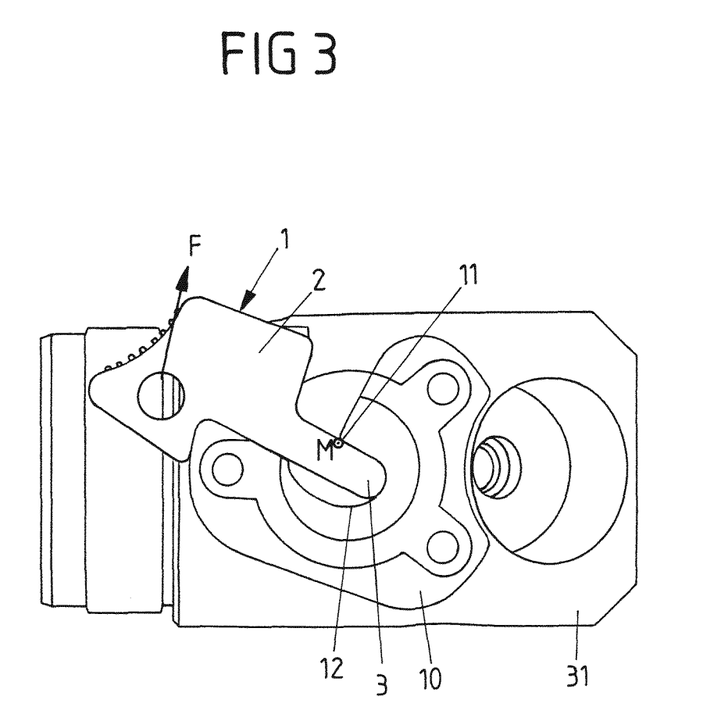
FIG. 3 illustrates a top view of an example securing mechanism in a first position.

The starting position essentially corresponding to the view of FIG. 2 is shown in a top view of FIG. 3.

The closing element 3 of the securing element 1 is arranged in the housing 10 and keeps the valve 20 closed (not shown here). The securing element 1 in this position is in the closed position.

One can notice in this view that the essentially oblong closing element 3 of the securing element 1 is arranged in a sliding block guide 12 of the housing 10. The sliding block guide 12 serves at least partly as an abutment 11 when a torque M is applied to the securing element 1.

In FIG. 3, the torque M is applied by a force F, which bears against the handling element 2, especially by the pulling on a cord as a traction element, which is arranged on the fastening element 4. Even if very large closing forces from the valve 20 (i.e., the valve tappet) are acting on the closing element 3 of the securing element 1, these closing forces can be quickly and easily overcome by the turning of the securing element 1 out from the housing 10 (unlike a linear pulling out, for example). The turning by the torque M about the abutment 11 thus enables a fast removal of the securing element 1 and thus a quick readiness of the pressurized gas tank. Basically, a kind of lever action is used here, by which the securing element 1 is pried out from the housing 10. The abutment 11 constitutes the fulcrum here.

The abutment 11 can provide a pointlike contact or a surface contact with the sliding block guide 12 of the housing 10, and different forms of contact can exist in different phases of the turning of the securing element 1.

Figure 4:
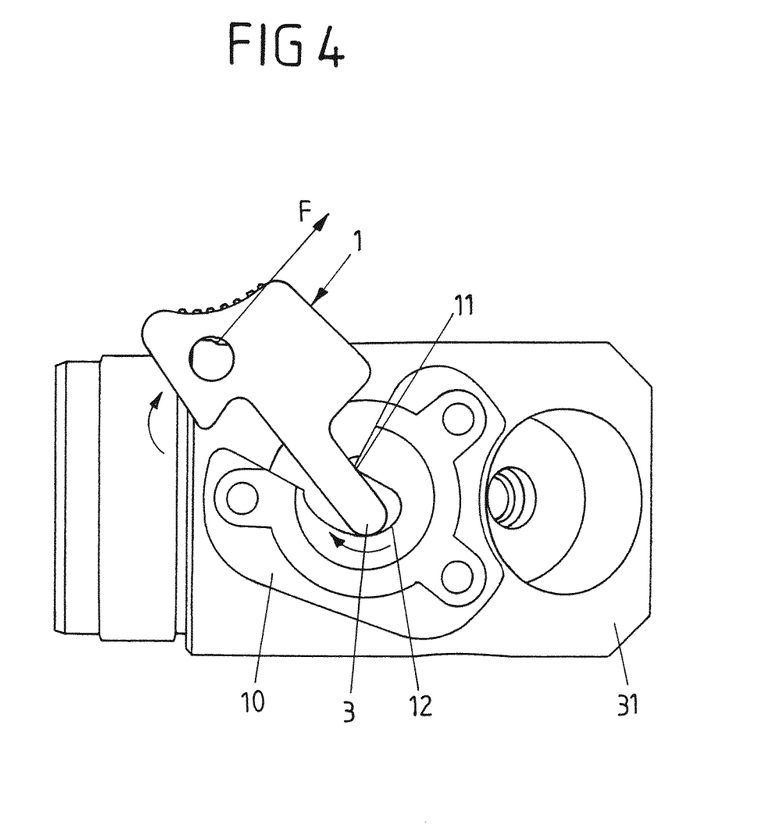
FIG. 4 illustrates a top view of an example securing element in a second position.

FIG. 4 shows a second position of the securing element 1 in its turning out from the housing 10, after the first position shown in FIG. 3. Based upon the torque M (produced by the force F), the securing element 1 has been turned around 10° clockwise. This produces a rotary movement about the abutment 11, against which one edge of the closing element 3 bears in the turning process. The end of the closing element 3—indicated by the arrow—is guided by the sliding block guide 12 during the rotary movement. But this guide is not absolutely necessary for the applying of the torque M. In this second position, the valve 20 is not yet released or unlocked, i.e., the valve 20 is not yet in the flow position.

Figure 5:
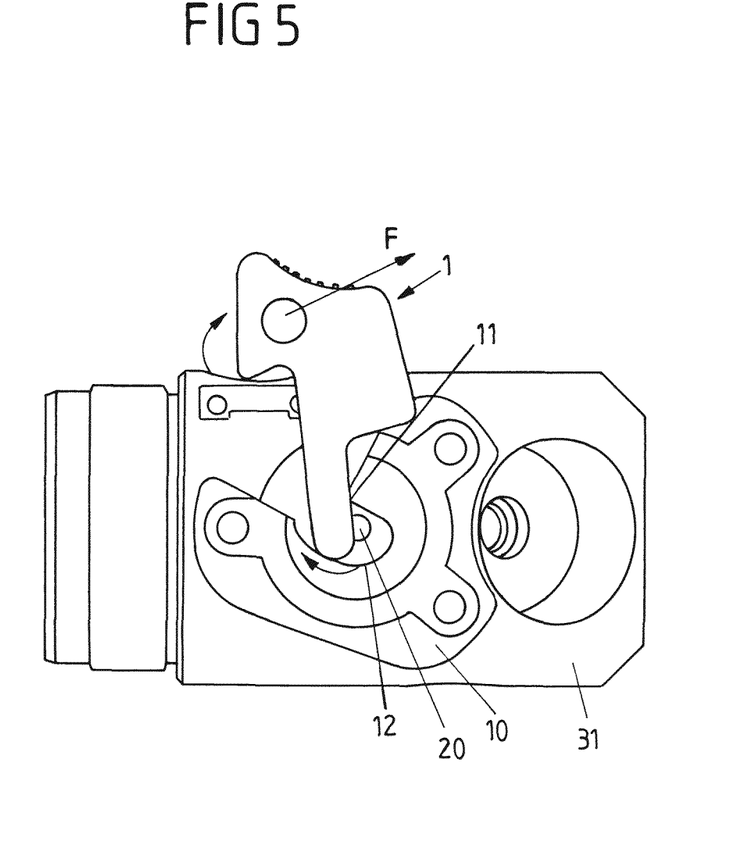
FIG. 5 illustrates a top view of an example securing element in a third position.

FIG. 5 shows a third position of the securing element 1, in which the rotation has proceeded further in the clockwise direction. The closing element 3 still bears against the abutment 11. The valve 20 is now recognizable in the top view, although it is not yet fully released. The lower end of the closing element 3—as in the position shown in FIG. 4—is guided by the sliding block guide 12.

Figure 6:
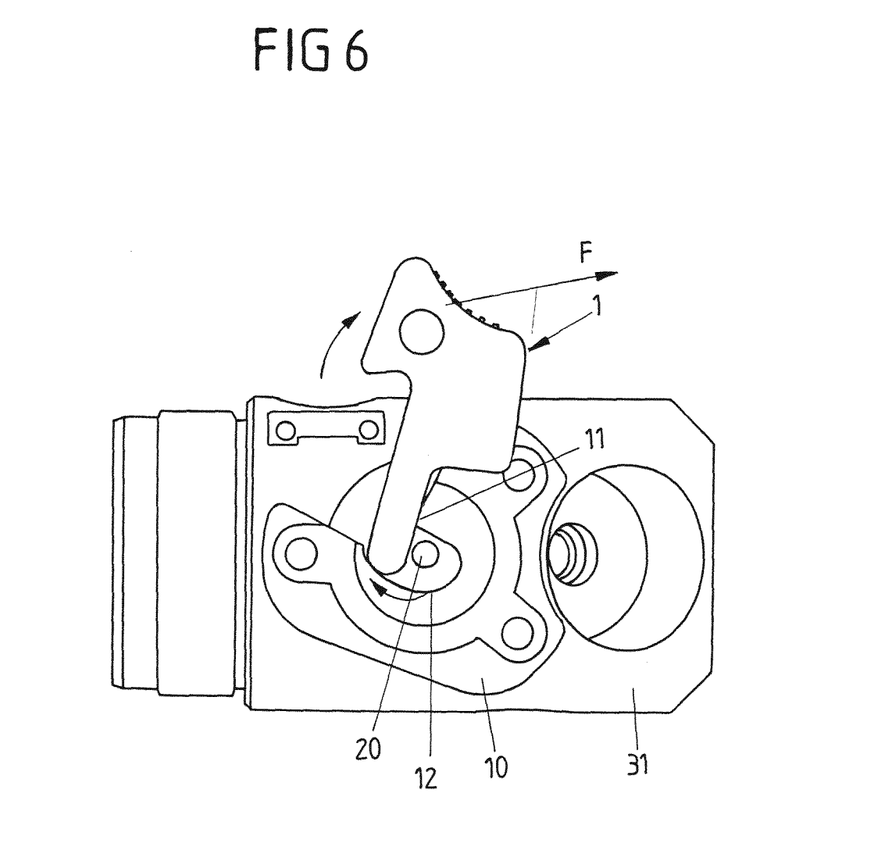
FIG. 6 illustrates a top view of an example securing element in a fourth position.

FIG. 6 shows the position when the securing element is fully turned out from the housing by the torque M. The securing element 1 can be easily removed from the housing 10 and the valve 20 is in the complete flow position.

Thus, by applying a predetermined torque M, the securing element 1 can be turned out from the housing 10. The magnitude and direction of the torque M is determined by the length of the rotating distance and the force of the valve 20 which is acting on the securing element 1. The rotating distance is also influenced by the size and/or shape of the sliding block guide 12.

Figure 7:
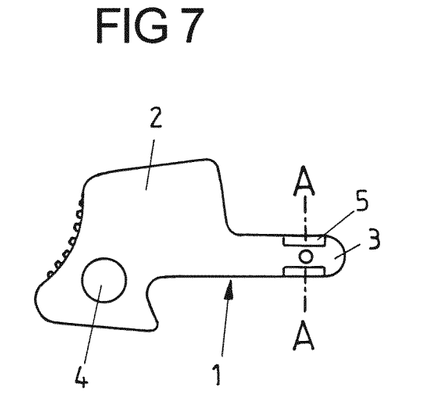
FIG. 7 illustrates a top view of an example securing element.

FIG. 7 shows one embodiment of a securing element 1 in a top view in which segments with beveled edges 5 are arranged at the side on the securing element 3. These are shown in sectional view A-A in FIG. 7A.

Figure 7A:
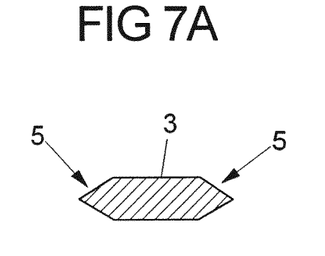
FIG. 7A illustrates a section view of a detail of an example securing element.

These beveled edges 5 serve as bearing surfaces for the valve force of the valve 20 and have the effect that, when the securing element 1 is turned out from the housing 10, the valve 20 under high pretensioning can already come somewhat out from the closed position even though the securing element 1 is not yet completely removed from the housing 10. The slanting bevels 5 exert a force on the closing element 1 via the valve 20 that accelerates the turning out from the housing or even produces an automatic ejecting from the housing 10. Lastly, acting force sustains the torque M with which the securing element 1 is turned out from the housing.

The geometrical arrangement and shape of securing element 1, housing 10, valve 20 and/or valve housing 31 shown here is only to be understood as an example, since other arrangements may also be used in other embodiments and can fulfill the same desired function.

Figure 8:
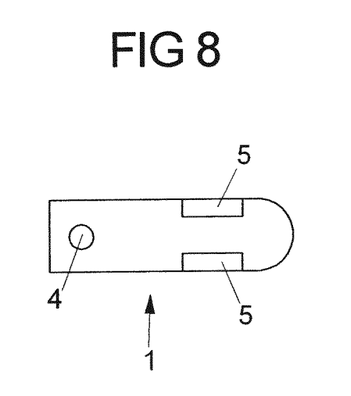
FIG. 8 illustrates a top view of an alternative embodiment of a securing element.

In the embodiments presented thus far, the securing element essentially has the shape of a key. FIG. 8 shows an essentially rod-shaped or cube-shaped variant. The handling element 3 here is not formed as a broadened cross section. Instead, the force F here is applied across a traction element, which engages with a lug 4. Essentially, the securing element can also be configured as an oblong or curved element.

The disclosure of the embodiments herein has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A securing device for a valve of a pressurized gas tank, comprising:

a securing element that comprises at least a portion received in a recess defined by a movable valve element of the valve, wherein the securing element is moved from a closed position to a flow position by applying a torque, wherein at least one part of a housing comprises an abutment for the securing element when the torque is applied, wherein the abutment is arranged at least partly on a sliding block guide in the housing, wherein the valve is closed in the closed position of the securing element and is brought spontaneously into a flow position, in which the securing element is displaced out of contact with the movable valve element, after applying a specified torque to the securing element.

2. The securing device of claim 1, wherein the securing element has a handling element as a point of application of a force producing the torque.

3. The securing device of claim 2, wherein the handling element has a fastening element for a traction element to apply the torque.

4. The securing device of claim 1, wherein a pointlike or a surface contact is provided on the abutment between the securing element and the housing.

5. The securing device of claim 1, wherein the securing element is in the form of at least one of a key, a rod, or a flat cube.

6. The securing device of claim 1, comprising an arrangement configured to convert a valve force of the valve into a force to sustain the applied torque.

7. The securing device of claim 6, wherein at least one surface of application is arranged on the securing element for the valve force of the valve, and the valve force is diverted by the surface of application so that it sustains the torque.

8. The securing device of claim 1, further comprising a detent on the securing element, wherein the detent, together with the valve, facilitates a removable locking in the closed position.

9. The securing device of claim 1, wherein the valve is configured as an automatically activated valve.

10. A securing device for a valve of a pressurized fluid tank, comprising:
- a valve connected to the pressurized fluid tank;
- a movable valve element disposed within the valve and reversibly obstructing flow of fluid from the pressurized fluid tank via the valve; and
- a securing element that, in a first position, comprises at least a portion received within a recess defined by the movable valve element and holds the movable valve element in a closed position;
- the securing element movable to a second position by lever action about a fulcrum provided by at least one element of the valve;
- wherein, in the second position, the securing element is displaced out of contact with the movable valve element to allow the movable valve element to spontaneously transition to an open position to provide flow of the fluid from the pressurized fluid tank.

11. The securing device of claim 10, wherein the securing element, in the first position, abuts the movable valve element in a substantially perpendicular arrangement.

12. The securing device of claim 11, wherein the securing element moves substantially perpendicular with respect to a vertical axis of the movable valve element.

13. The securing device of claim 10, wherein the securing element is shaped in a region proximate to a point of contact with the movable valve element.

14. The securing device of claim 13, wherein the shape includes at least one tapered edge.

15. The securing device of claim 13, wherein the shape facilitates translation of vertical movement of the movable valve element under pressure to substantially perpendicular movement of the securing element with respect to a vertical axis of the movable valve element.

16. The securing device of claim 15, wherein the substantially perpendicular movement of the securing element comprises rotational movement with respect to the fulcrum.

17. The securing element of claim 10, wherein the fulcrum comprises a point of contact between the securing element and the valve.

18. The securing element of claim 10, wherein an initial movement of the securing element between the first position and the second position is translated into automated opening movement by action of the movable valve element under pressure.

19. A pressurized fluid tank, comprising:
- a tank holding pressurized fluid;
- a valve connected to the tank;
- a movable valve element disposed within the valve and reversibly obstructing flow of fluid from the tank via the valve; and
- a securing element that, in a first position, comprises at least a portion received within a recess defined by the movable valve element in a fashion to hold the movable valve element in a closed position;
- the securing element being movable to a second position by lever action about a fulcrum provided by at least one element of the valve;
- wherein, in the second position, the securing element is displaced out of contact with the movable valve element to allow the movable valve element to spontaneously transition to an open position to provide flow of the fluid from the tank.

* * * * *